US008910365B2

(12) United States Patent
Walser

(10) Patent No.: US 8,910,365 B2
(45) Date of Patent: Dec. 16, 2014

(54) METHOD FOR THE PRODUCTION OF A STEERING SPINDLE PORTION FORMING A SECTION OF A STEERING SPINDLE

(75) Inventor: Michael Walser, Cholula Puebla (MX)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 432 days.

(21) Appl. No.: 13/401,116

(22) Filed: Feb. 21, 2012

(65) Prior Publication Data

US 2012/0160051 A1 Jun. 28, 2012

Related U.S. Application Data

(63) Continuation-in-part of application No. PCT/EP2010/004581, filed on Jul. 27, 2010.

(30) Foreign Application Priority Data

Aug. 21, 2009 (DE) .......................... 10 2009 038 316

(51) Int. Cl.
| | |
|---|---|
| *B21D 39/04* | (2006.01) |
| *B23P 11/00* | (2006.01) |
| *B23P 15/00* | (2006.01) |
| *B62D 1/10* | (2006.01) |
| *B62D 1/16* | (2006.01) |
| *F16D 1/072* | (2006.01) |
| *F16B 4/00* | (2006.01) |
| *B21D 41/02* | (2006.01) |

(52) U.S. Cl.
CPC .............. *B23P 11/005* (2013.01); *B21D 39/046* (2013.01); *F16B 4/004* (2013.01); *B21D 41/026* (2013.01); *B23P 15/00* (2013.01); *B62D 1/10* (2013.01); *B62D 1/16* (2013.01); *F16D 1/072* (2013.01)

USPC ................... 29/505; 29/507; 29/515; 29/516; 180/78; 464/183; 403/285; 280/93.512

(58) Field of Classification Search
CPC .... B21D 39/20; B21D 39/046; B21D 41/026; F16B 4/004; B62D 1/16; F16D 1/072
USPC ........ 29/510, 511, 512, 515, 516, 521, 894.1, 29/421.1, 507; 180/78; 464/183; 74/492; 403/282, 285; 280/93.512
See application file for complete search history.

(56) References Cited

U.S. PATENT DOCUMENTS

| 2,926,029 A | 2/1960 | St. Clair et al. |
| 4,238,539 A | 12/1980 | Yates et al. |

(Continued)

FOREIGN PATENT DOCUMENTS

| CH | 148546 | 7/1931 |
| CN | 1640728 | 7/2005 |

(Continued)

OTHER PUBLICATIONS

Chinese Office Action issued Nov. 1, 2013 in corresponding Chinese patent application No. 2010800373219 with English translation.

(Continued)

*Primary Examiner* — Jermie Cozart
(74) *Attorney, Agent, or Firm* — Wenderoth, Lind & Ponack, L.L.P.

(57) ABSTRACT

The invention relates to a method of producing a steering shaft part that forms a section of a steering shaft, the steering shaft part including a reinforcement section at least in an end area, over which reinforcement section the steering shaft part has a wall thickness that is enlarged relative to an adjacent section of the steering shaft part extending toward the longitudinal center of the steering shaft part. The steering shaft part includes a pipe and a sleeve that is arranged in the reinforcement section of the steering shaft part and that form the enlarged wall thickness.

15 Claims, 6 Drawing Sheets

(56) References Cited

U.S. PATENT DOCUMENTS

| | | | |
|---|---|---|---|
| 4,255,986 A * | 3/1981 | Mukoyama | 74/492 |
| 4,304,147 A | 12/1981 | Linnemeier et al. | |
| 4,469,356 A * | 9/1984 | Duret et al. | 285/332 |
| 4,482,174 A | 11/1984 | Puri | |
| 4,572,022 A | 2/1986 | Mettler | |
| 4,738,154 A | 4/1988 | Hancock | |
| 4,819,961 A | 4/1989 | Henigue | |
| 4,938,094 A | 7/1990 | Cochard | |
| 5,230,661 A | 7/1993 | Schreiber et al. | |
| 5,855,053 A | 1/1999 | Arena | |
| 5,937,500 A | 8/1999 | Bobbitt, III | |
| 6,345,431 B1 * | 2/2002 | Greig | 29/506 |
| 6,484,384 B1 | 11/2002 | Gibson | |
| 7,497,470 B2 | 3/2009 | Streng et al. | |
| 7,779,945 B2 | 8/2010 | Allgauer | |
| 2001/0004794 A1 | 6/2001 | Kumar | |
| 2003/0154815 A1 | 8/2003 | Heiml | |
| 2004/0020249 A1 | 2/2004 | Battermann et al. | |
| 2004/0034981 A1 | 2/2004 | Harms et al. | |
| 2004/0118239 A1 | 6/2004 | Kittler et al. | |
| 2004/0177715 A1 | 9/2004 | Kittler et al. | |
| 2005/0184536 A1 | 8/2005 | Altmann et al. | |
| 2005/0194775 A1 | 9/2005 | Bastein et al. | |
| 2009/0051153 A1 | 2/2009 | Allgauer | |

FOREIGN PATENT DOCUMENTS

| | | |
|---|---|---|
| CN | 200977941 | 11/2007 |
| DE | 25 45 927 | 4/1977 |
| DE | 30 47 335 | 9/1981 |
| DE | 8593 | 9/1985 |
| DE | 37 06 743 | 9/1987 |
| DE | 197 50 005 | 4/1999 |
| DE | 103 47 101 | 5/2005 |
| DE | 10 2004 009 188 | 9/2005 |
| DE | 10 2006 010 228 | 11/2007 |
| EP | 0 024 986 | 3/1981 |
| EP | 1 138 575 | 10/2001 |
| FR | 2 473 975 | 1/1981 |
| FR | 2 508 860 | 6/1982 |
| JP | 3089459 | 9/2000 |
| JP | 3176113 | 6/2001 |
| WO | 97/48507 | 12/1997 |
| WO | 02/02377 | 1/2002 |
| WO | 2007/098513 | 9/2007 |

OTHER PUBLICATIONS

Chinese Search Report issued Nov. 1, 2013 in corresponding Chinese patent application No. 2010800373219.

International Search Report issued Oct. 5, 2010 in International (PCT) Application No. PCT/EP2010/004581.

German Search Report issued Aug. 21, 2009 in German Patent Application No. 10 2009 038 316.6.

* cited by examiner

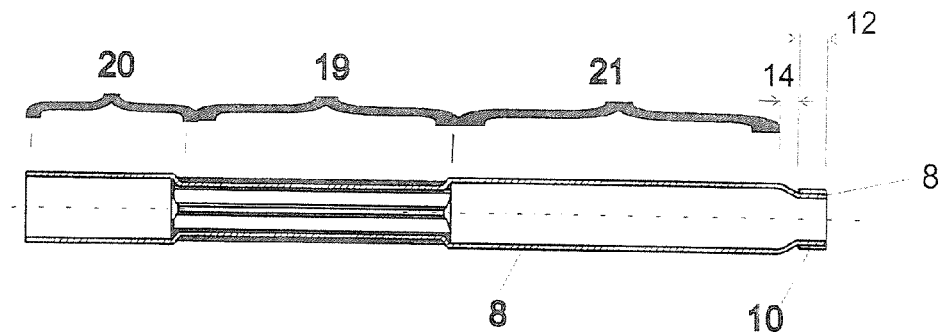
Fig. 10
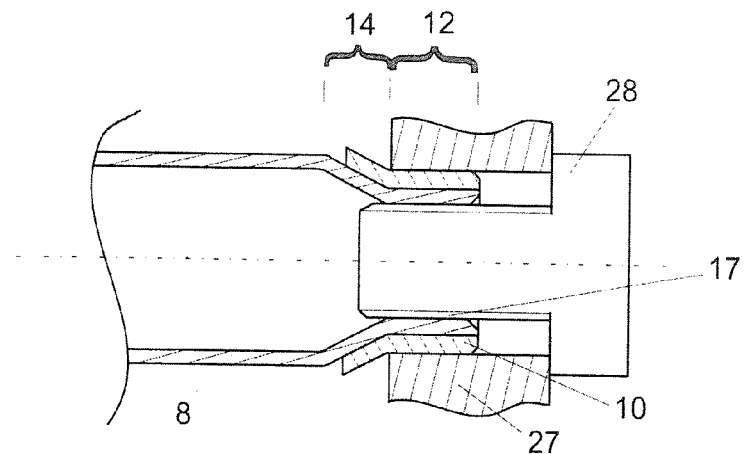
Fig. 11
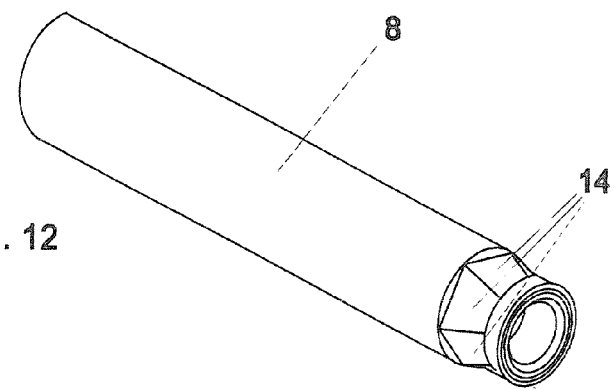
Fig. 12
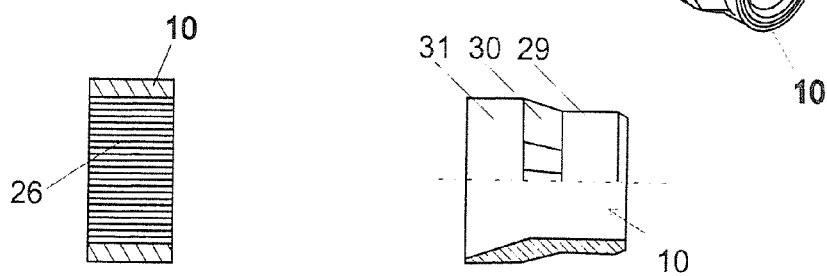
Fig. 13
Fig. 14

METHOD FOR THE PRODUCTION OF A STEERING SPINDLE PORTION FORMING A SECTION OF A STEERING SPINDLE

This application is a Continuation-in-Part application of International application No. PCT/EP2010/004581, filed Jul. 27, 2010, the entirety of which is incorporated herein by reference.

BACKGROUND OF THE INVENTION a) Field of the Invention

The invention relates to a method for the production of a steering spindle portion forming a section of a steering spindle, which, at least in an end region, includes a reinforcement section over which the steering spindle portion has a wall thickness that is increased compared to a section of the steering spindle portion adjoining toward the longitudinal center of the steering spindle portion. The steering spindle portion comprises a tube and a sleeve located in the reinforcement section of the steering spindle portion and forming the increased wall thickness. The method comprises the formation of connection elements which serve for the connection of the steering spindle portion with a steering wheel or a yoke for a universal joint or a steering pinion and of which at least a portion is located in the reinforcement section reinforced by the sleeve. The invention further relates to a steering spindle portion implemented in this manner and connected with a steering wheel.

b) Description of Related Prior Art

Steering spindles of motor vehicles conventionally comprise several steering spindle portions each forming a section of the steering spindle. On the steering spindle section which, relative to the traveling direction, is the rearmost, the steering wheel is secured in position on its rearward end. On the steering spindle section which, relative to the traveling direction is the frontmost, a pinion for the engagement into the steering gear is frequently secured in position at its front end. Apart from steering spindle portions connected across universal joints with one another, steering spindle portions that are displaceable (telescopable) with respect to one another can be provided, which serve for setting the length of the steering column and/or for receiving longitudinal dislocations in the event of a crash.

In a known embodiment, the connection of the steering wheel with the rearmost steering spindle portion takes place by means of a bolted connection. The steering spindle portion realized in the form of a hollow shaft includes for this purpose a connection section at the end side which, starting from the end of the steering spindle portion, comprises a substantially hollow cylindrical section and adjoining this a conical section expanding toward the center of the steering spindle portion. The hollow cylindrical section is provided with internal threading and outer toothing. The outer toothing engages into an inner toothing of the hub of the steering wheel and by means of the inner threading the steering wheel is bolted to the steering spindle portion. For this purpose, the steering spindle portion must have a sufficiently large wall thickness in the connection section, in particular in the hollow cylindrical end section. This thickness is greater than the wall thickness required for the transmission of the torque over the remaining length of the steering spindle portion. For the implementation of the steering spindle portion conventionally tubes are therefore utilized which—apart from the connection section—initially have a greater wall thickness than is required. The tube is subsequently worked over its entire length, in particular by swaging or similar reforming methods, for example, knead-working. Herein the diameter in the connection section of the tube is decreased. Over the remaining length of the tube, the wall thickness of the tube is decreased. Further, herein structures can also be worked in over sections of the tube which, for example, serve for the telescopable yet non-turnable connection with a further steering spindle portion. The realization of such contours, in particular in the form of spiral toothings or cloverleaf profiles, is known. For example DE 197 50 005 C1 discloses a steering spindle portion with such contours.

This process is highly labor intensive and also difficult to control due to the required reforming of the tube over its entire length.

While it is feasible to thicken up the wall thickness of a tube by swaging, however, due to factors limiting such thickening, a tube must nevertheless be utilized as a starting product which has a greater wall thickness than would be necessary for the requisite torque transmission. The steering spindle portion becomes thereby overall heavy or the tube must, again, be worked over its entire length in order to decrease accordingly the wall thickness apart from the connection section.

DE 10 2004 009 188 A1 discloses two telescopably connected steering spindle parts which, viewed in longitudinal cross-section, have complicated contours with different thickness regions of their wall thicknesses, wherein at their ends remote from one another connection sections are provided for the connection with a steering wheel or a steering gear. Such wall thickness profiles can be realized through reforming working of tubes over their entire lengths.

Securement in position of a steering wheel on a steering shaft by means of a bolt located transversely to the axis of the steering spindle, which bolt cooperates with a retaining cone and displaces it in a recess of the steering wheel hub and tightens it against the steering shaft, is disclosed in EP 1 138 575 B1. The steering spindle portion, on the end of which the steering wheel is secured, is solid. However, the steering spindle portion could also be realized as a hollow shaft with a sufficiently thick wall thickness.

A further securement of a steering wheel at the end of the steering spindle portion adjoining the steering wheel is disclosed in U.S. Pat. No. 4,819,961 A. The steering spindle portion realized as a hollow shaft includes at the end side a connection section in which the tube of the steering spindle portion initially tapers conically toward its end and adjoining thereon includes a hollow cylindrical section with an inner toothing. In the connection section is disposed a clamp piece whose outer contour corresponds to the inner contour of the tube and which projects at the end side from the tube. It comprises first and second outer toothings which, on the one hand, cooperate with the inner toothing of the tube and, on the other hand, with an inner toothing of the steering wheel hub, and comprises further an inner threading into which a bolt engaging on the steering wheel hub is screwed in order to tighten the parts with one another. Due to the solid tightener set into the connection section, the wall thickness of the steering spindle portion can be implemented such that it is constant over its length. With such a clamping connection, there is the risk that the applied clamping forces decrease over time whereby an undesirable play can develop. Moreover, the clamp piece must be introduced from the steering wheel-remote side through the steering spindle portion. The steering spindle portion consequently cannot include any regions with decreased cross-section, for example in order to implement a telescopable, torque transmitting connection with a further steering spindle portion. The clamp piece furthermore can slip into the interior of the steering spindle portion if the steering wheel is removed and is subsequently inaccessible.

DE 25 45 927 B2 discloses a steering spindle portion in the form of a safety shaft piece. This safety shaft piece comprises a corrugated central section extending over the major portion of the length of the shaft piece and adjoining which is a cylinder sleeve section on both sides. In the cylinder sleeve section is disposed a cylindrical pin of a shaft connection. Into the cylindrical pin of the shaft connection several radial bores are worked, whereupon the shaft tube with its end-side cylinder sleeve section is axially slid onto the pin. From the material of the cylinder sleeve section subsequently radial projections are pressed out and pressed into the radial bores, whereupon the pin and the cylinder sleeve section are additionally connected with one another on the axial front side facing away from the shaft tube by welding.

DE 103 47 101 A1 discloses in general the connection of two tubular structural parts by means of external high-pressure reforming. The description explains that in this reforming the external tube is plastically deformed and the internal tube is elastically deformed.

U.S. Pat. No. 4,304,147 discloses a steering column in which, for the reinforcement of an upper section of the steering column, an inner tube is disposed in the outer tube to increase the wall thickness. For the securement of the inner tube in the outer tube, the outer tube is brought into contact with the inner tube using mechanical means. The inner tube, moreover, includes a tapering portion which is in contact with the outer tube. The two tubes in contact with one another act like one tube with a wall thickness equal to the composite wall thickness of the two utilized tubes as long as the tubes are subjected to flexural stress.

However, in this case, the structure proposed in U.S. Pat. No. 4,304,147 no longer provides the desired reinforcement effect if, in addition to flexural stress, also tensile and pressure stresses, securement stresses or torques are to be absorbed by the tube-in-tube combination.

WO 97/48507 A1 discloses the connection of two tubular shaft parts, for example of a steering spindle, in an overlapping section of the two shaft parts, wherein the shaft portion located interiorly in the overlap section is expanded.

WO 02/02377 A1 shows an overload safety, in particular for a steering wheel lock, wherein an outer sleeve-shaped joining portion encompasses a tubular steering spindle portion and is connected with it via a press-fit, wherein the friction closure is released in the event of an overload.

U.S. Pat. No. 4,469,356 A relates to the implementation of plugs for fluid lines, in particular in aircraft. For the simple implementation of such plug connectors the plug connectors are formed integrally with the ends of the pipe lines, wherein the ends of the pipe lines are reformed correspondingly together with sleeves disposed thereon.

A steering spindle portion of the type described in the introduction is disclosed in WO 2007/098513 A1. In the production of this steering spindle portion a sleeve is set into, in particular pressed into, an end section of the tube, whereupon the end section of the tube and the sleeve are reformed jointly. Herein, a flowing of the material of the tube and of the sleeve occurs. Further, after the reforming of tube and sleeve, internal threadings are introduced into the inner wall of the sleeve and the tube is provided with an outer toothing in a section adjoining its end. In the steering spindle portion implemented in this manner there is the risk in the case of a repair that the sleeve becomes detached from the tube, in particular if the portion involved is that steering spindle portion at which the steering wheel is connected. The reason therefor is that for the detaching of the steering wheel a hammer is frequently pounded onto the central connection bolt to facilitate detaching the steering wheel from the steering spindle. Through these hammer blows it is possible for the sleeve to be driven into the interior of the tube. A further disadvantage of the solution proposed in this document comprises that the joined reforming of the sleeve with the connection section requires a relatively complex reforming method, for example swaging operations.

SUMMARY OF THE INVENTION

The object of the invention is to provide a method of the type described in the introduction which is simple and cost-effective in realization and with which a secure connection between the tube and the sleeve is made possible, or to provide a steering spindle portion connected with a steering wheel of the type described in the introduction, which can be produced simply and cost-effectively and in which a secure connection between tube and sleeve can be attained.

According to the invention, this is achieved through a method for the production of a steering spindle portion forming a section of a steering spindle, which portion includes at least in an end region a reinforcement section over which the steering spindle portion has an increased wall thickness compared to a section of the steering spindle portion adjoining toward the longitudinal center of the steering spindle portion. The steering spindle portion comprises a tube and a sleeve located in the reinforcement section of the steering spindle portion and forming the increased wall thickness. The method comprises the steps that for the implementation of the reinforcement section of the steering spindle portion the sleeve is axially slid over an end section of the tube and subsequently the tube is widened at least over a portion of the length of the end section encompassed by the sleeve and herein is plastically deformed and thereby the sleeve is elastically and plastically deformed. Connection elements are implemented which serve for the connection of the steering spindle portion with a steering wheel or a yoke for a universal joint or a steering pinion, and of which at least a portion is located in the reinforcement section reinforced by the sleeve.

A steering spindle portion according to the invention connected with a steering wheel or a yoke for a universal joint or a steering pinion, which portion forms a section of a steering spindle and is implemented in an end region with a reinforcement section over which the steering spindle portion has a wall thickness that is increased compared to a section of the steering spindle portion adjoining toward the longitudinal center of the steering spindle portion. The steering spindle portion comprises a tube also a sleeve located in the reinforcement section of the steering spindle portion and forming the increased wall thickness. The sleeve is disposed on the outer surface of an end section of the tube and secured against a displacement with respect to the tube in the axial direction of the tube and in the rotational direction under force closure and/or form closure. Connection elements are provided for the connection with the steering wheel or the yoke for the universal joint or the steering pinion, of which at least one portion is located in the reinforcement section reinforced by the sleeve.

In the method of the invention for the implementation of the reinforcement section of the steering spindle portion, the sleeve is slid over an end section of the tube, thus onto the outer surface of the tube. It is preferably pressed on with the formation of a press-fit. The tube is furthermore widened at least over a portion of the length of its end section encompassed by the sleeve under plastic deformation, thus increased in its diameter. Herein a highly stable connection between the sleeve and the tube can be realized. The sleeve is elastically and plastically deformed during the widening of the tube.

The outer surface of the end section of the tube or the inner surface of the sleeve is advantageously provided with a toothing extending in the axial direction of the tube or the sleeve, wherein the teeth of the toothing carve into the other of the two parts during the widening of the tube. Such a toothing could also be referred to as an axial grooved knurl. Instead, material elevations extending in the circumferential direction in the form of an annular grooved knurl (=roller-bead burnishing) can also be provided or teeth, beads or webs, for example in the form of a diamond knurl, extending in at least one oblique direction. A combination of an axial toothing on one of the two parts with an annular grooved knurl or teeth, beads or webs, extending in at least one oblique direction on the other of the two parts is conceivable and feasible.

The steering spindle portion is advantageously implemented overall as a hollow shaft. Herein in the method according to the invention a commercially available hollow cylindrical tube can advantageously be considered as a starting product for the production of the steering spindle portion. It suffices to select the wall thickness of the hollow cylindrical tube utilized as the starting product just thin enough such that an adequate stability of the steering spindle portion, in particular for the required transmission of the torque, is obtained. Reforming work of the tube over its entire length to attain beyond the connection section a desired thinner wall thickness is consequently not required. The sleeve can also be a tube section of a commercially available hollow cylindrical tube. However, alternatively it is also conceivable and feasible to provide the sleeve as a turned or formed part and to slide it according to the invention onto the end section of the tube. Through the sleeve slid onto the end section of the tube, a sufficiently large wall thickness is attained in the reinforcement section in order to enable a stable connection with another part of the steering column.

The reinforcement section is provided with connection elements serving for a connection of the steering spindle portion with another part. The connection with a yoke for a universal joint or a steering pinion is also feasible. At least a portion of the connection elements via which the connection takes place is herein located in the reinforcement section reinforced by the sleeve, which section has a greater wall thickness than a section adjoining the reinforcement section toward the longitudinal center of the steering spindle portion. Such connection elements with which the reinforcement section is provided can be an inner threading worked into the inner surface of the end section of the tube encompassed by the sleeve and/or a function contour worked into the outer surface of the sleeve which serves for forming a part to be connected under formation of a form closure acting in the rotational direction with the steering spindle portion. Such a function contour can be formed, for example, by a toothing extending in the axial direction of the sleeve or by an outer cross-sectional form of the sleeve deviating from a circular form, for example, by a polygonal contour or a circular contour provided with flattenings on opposite sides. Instead of, or in addition to, implementing the outer surface of the sleeve with a function contour, the tube can be provided in a section, adjacent to the reinforcement section, with a function contour which serves for the formation of a form closure acting in the rotational direction with a part to be connected with the steering spindle portion.

In an advantageous embodiment of the invention, the sleeve is provided with a function contour before it is slid onto the end section of the tube.

In a further advantageous embodiment of the invention, the function contour is worked into the outer surface of the sleeve after the tube has been widened in the end section encompassed by the sleeve, wherein during the working of the function contour into the sleeve a force or force component directed radially inwardly is applied. The strength of the connection between the sleeve and the tube can thereby be advantageously further increased.

It is also conceivable and feasible to reduce the sleeve after the widening of the end section only over a portion of its length through the action of an inwardly directed force or force component and, in the process, not to change the function contour formed in advance in the other portion of its length.

An advantageous embodiment of the invention provides that during the widening of the tube in the end section encompassed by the sleeve simultaneously into the inner surface of the tube an inner threading is formed. For this purpose an expanding mandrel is inserted which is simultaneously implemented as a mandrel for thread rolling.

The tube is preferably provided with an expanding section, in particular tapering conically toward the center of the steering spindle portion, which adjoins the end section onto which the sleeve is slid, or is entirely or partially located in this end section. This expanding section can counteract under form closure a shifting of the sleeve toward the center of the steering spindle portion.

In an advantageous embodiment of the invention, before the sleeve is axially slid onto the end section of the tube, the tube is reduced, thus its diameter is decreased, over the end section and optionally over a section adjoining toward the longitudinal center of the tube, wherein it is plastically deformed. This reduction can take place for example by pressing and/or through encircling milling or knurling. Other reducing methods, for example by swaging, are also conceivable and feasible. During the reduction of the tube, into the end section of the tube a toothing extending into the axial direction or an axial knurling can advantageously be worked into its outer surface. Apart from this toothing or knurling, the end section of the tube can be implemented as a hollow cylinder. The expanding, preferably conically expanding, section adjoins onto this consequently substantially hollow cylindrical end section advantageously toward the longitudinal center.

In addition to the described reforming in the end section and the section adjoining toward the longitudinal center, over further sections of the tube, appropriate material reforming work can be carried out in which geometries are required that deviate with respect to the original hollow cylindrical form (for example, for the implementation of circumferential spiral toothings or clover-leaf profiles) in order to implement a displaceable yet torque-transmitting connection (telescope connection) with a further steering spindle portion.

BRIEF DESCRIPTION OF THE DRAWINGS

Further advantages and details of the invention will be explained in the following in conjunction with the enclosed drawings, in which:

FIG. 4 is a view of a portion of the tube, partially cut, after a section adjoining its end has been reduced, together with the sleeve to be slid on;

FIG. 10 is a longitudinal cross-section through the finished steering spindle portion;

FIG. 11 is a depiction analogous to FIG. 9 according to a further embodiment variant of the invention with a portion of a steering wheel secured on the steering spindle portion;

FIG. 12 is an oblique view of a portion of a steering spindle portion according to a further embodiment variant of the invention;

FIG. 13 is a longitudinal cross-section through a sleeve according to a further embodiment variant of the invention;

FIG. 14 shows a sleeve with a partially prefabricated function contour;

DETAILED DESCRIPTION OF THE PREFERRED EMBODIMENTS

Figures 1, 2:
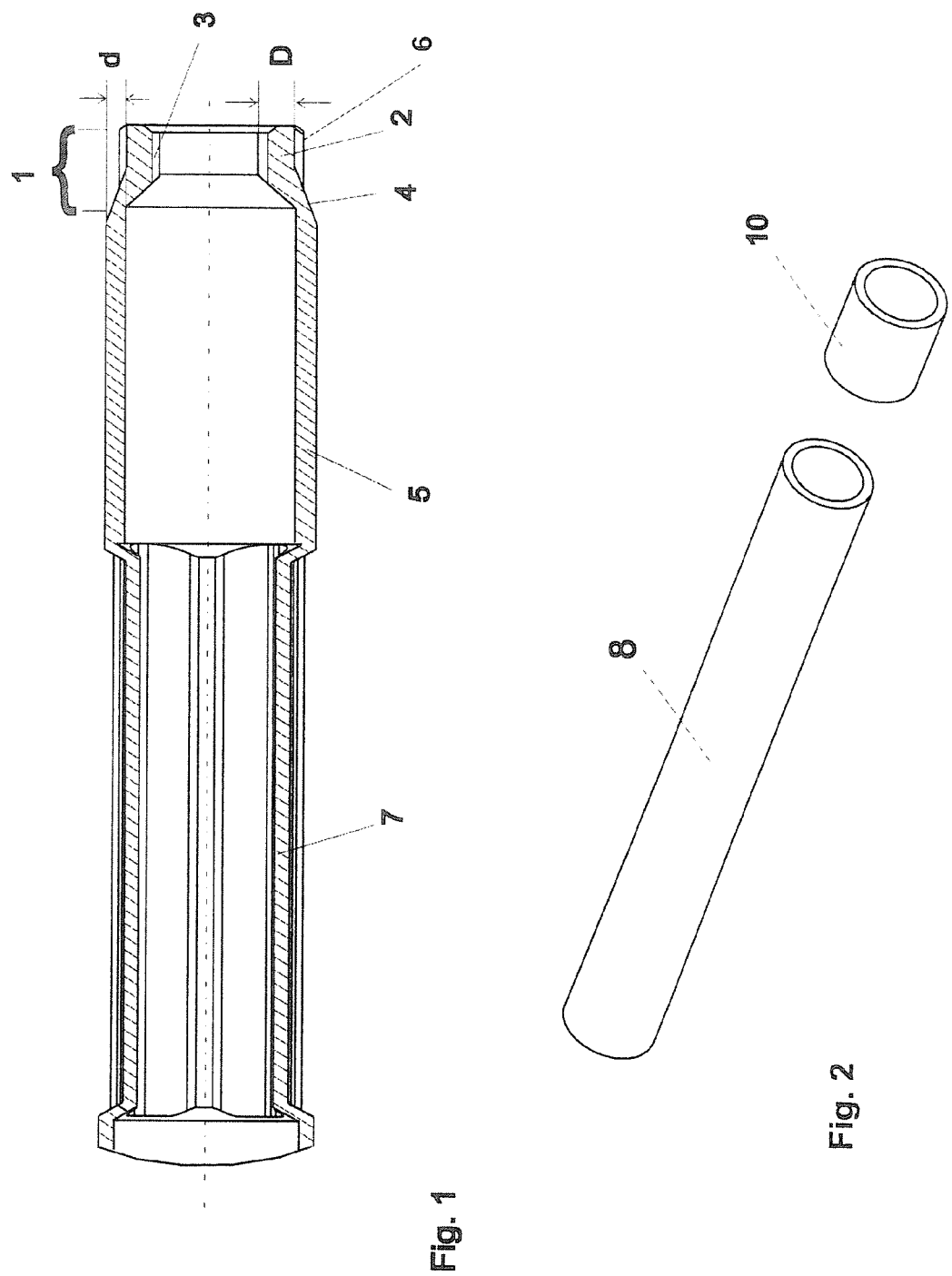
FIG. 1 shows a steering spindle portion according to prior art in longitudinal cross-section.
FIG. 2 is a three-dimensional depiction of a hollow cylindrical tube and a sleeve as starting products for carrying out the method according to the invention.
Figure 3:
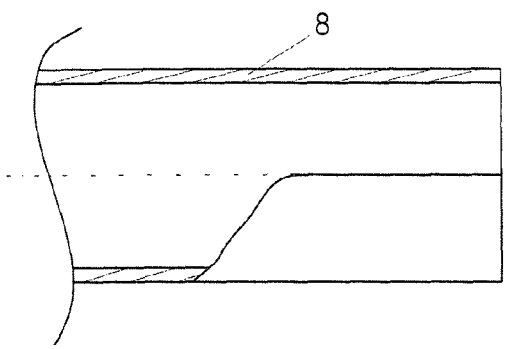
FIG. 3 is a partially cut view onto a portion of the tube adjoining an end.
Figure 4:
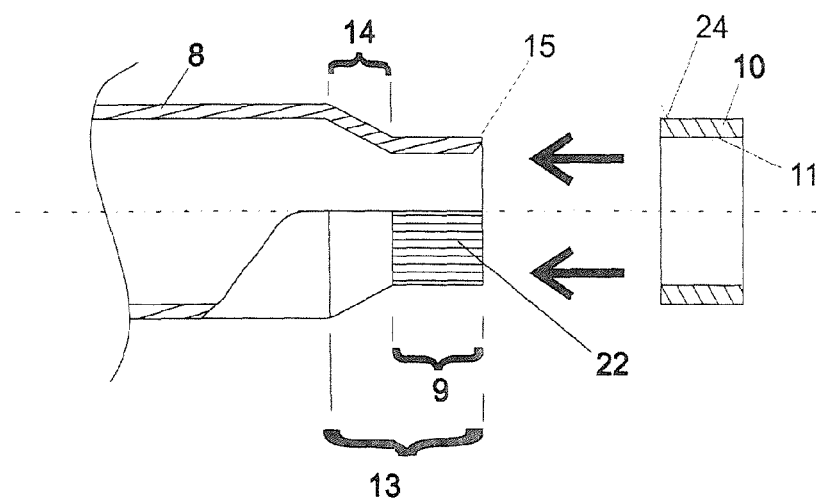

A steering spindle portion according to prior art will be explained first in conjunction with FIG. 1. The portion involved here is the rearmost, referred to the traveling direction, steering spindle portion of a steering spindle for a motor vehicle, at which at the end side a steering wheel is to be attached. The steering spindle portion for this purpose comprises a connection section 1 at the end facing the steering wheel. Starting from the end of the steering spindle portion, this connection section 1 comprises a hollow cylindrical section 2, in which an inner threading 3 and an outer toothing 6 are realized, and adjoining thereon toward the center of the steering spindle portion a conically expanding section 4. In particular in the hollow cylindrical section 2 the wall thickness D is greater than the wall thickness d in a section 5 of the steering spindle portion adjoining the connection section 1.

To connect the (not shown) steering wheel with the steering spindle portion, the steering wheel is slid onto the connection section 1 so that wherein it comes into contact with a conical inner wall on the conical section 4 and engages with inner toothing into the outer toothing 6. The steering wheel is further bolted onto the steering spindle portion by means of a bolt screwed into the inner threading 3.

On the side facing away from the connection section 1, the steering spindle portion includes a section 7 in which it is provided with a contour deviating from a circular arc in order to form a connection with a further steering spindle portion, which connection is displaceable (telescopable) in the longitudinal direction of the steering spindle portion, yet is torque-transmitting. The section 7 can in particular be implemented with a circumferential spiral toothing or a cloverleaf profile.

For the production of this steering spindle portion a tube is utilized as the starting product which has the same diameter as that found in the region of section 5 and a wall thickness corresponding to the wall thickness D in the connection section 1. At least this initial wall thickness is greater than the wall thickness d in section 5 which is still sufficient to transmit the torque since otherwise a sufficient wall thickness cannot be realized in the connection section 1. For the production of the steering spindle section this tube is consequently worked using reforming over its entire longitudinal extent, in particular by swaging and/or knead-working. If the tube were to be left in sections 5 and 7 with its original wall thickness, it would lead to considerably increased requirement of material and to a correspondingly high weight of the steering spindle portion.

An embodiment of the implementation of a steering spindle portion according to the invention will be explained in the following section in conjunction with FIGS. 2 to 10.

A hollow cylindrical tube 8 is utilized (cf. FIG. 2) as the starting product for the steering spindle portion, to be realized as a hollow shaft, for a motor vehicle, which forms a section of the longitudinal extent of a steering column, e.g. the tube 8 has over its entire longitudinal extent a uniform wall thickness. Selection of the wall thickness d of tube 8 is made on the basis of the torque to be transmitted and further requirements, in particular referred to the stiffness and stability, made of the steering spindle in the regions adjoining the end section 9. Enabling the connection of the steering spindle with the steering wheel is not a criterion for the selection of the wall thickness of tube 8.

As a starting product, furthermore, for the steering spindle portion to be realized a hollow cylindrical sleeve 10 is utilized.

The tube 8, first, is reduced in a section 13 adjoining one of its ends 15 through plastic deformation, e.g. it is decreased in its diameter, for example by pressing. Herein, a form is realized as is evident in FIG. 4. In an end section 9 adjoining the end 15 the tube has substantially a hollow cylindrical form (e.g. apart from the knurling or toothing 22 whose function will be described below). Adjoining this end section 9 is a section 14 conically expanding toward the longitudinal center of the tube. Other than conical forms of the transition between the end section 9 toward the longitudinal center are also conceivable and feasible.

The sleeve 10 is subsequently pressed axially onto the end section 9 of tube 8, whereupon the sleeve 10 axially encompasses the tube 8 over its end section 9 and is connected therewith under force closure. The end 15 of tube 8 and the end of sleeve 10 oriented in the same direction are herein flush with respect to one another. However, it is also conceivable and feasible that one of these two parts 8, 10 minimally projects axially beyond the other part.

Figure 5:
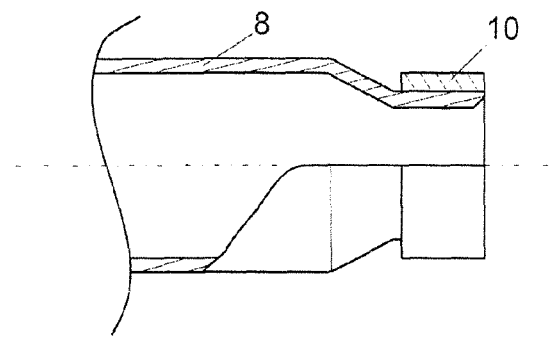
FIG. 5 is a depiction analogous to FIG. 4 after the sleeve has been slid onto an end section of the tube.
Figure 6:
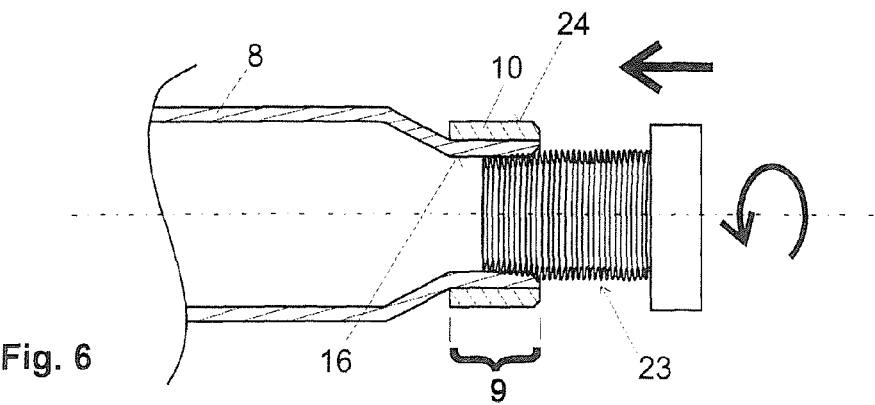
FIG. 6 is a longitudinal cross-section through a portion of the tube with the sleeve slid on during the widening of the end section of the tube.
Figure 7:
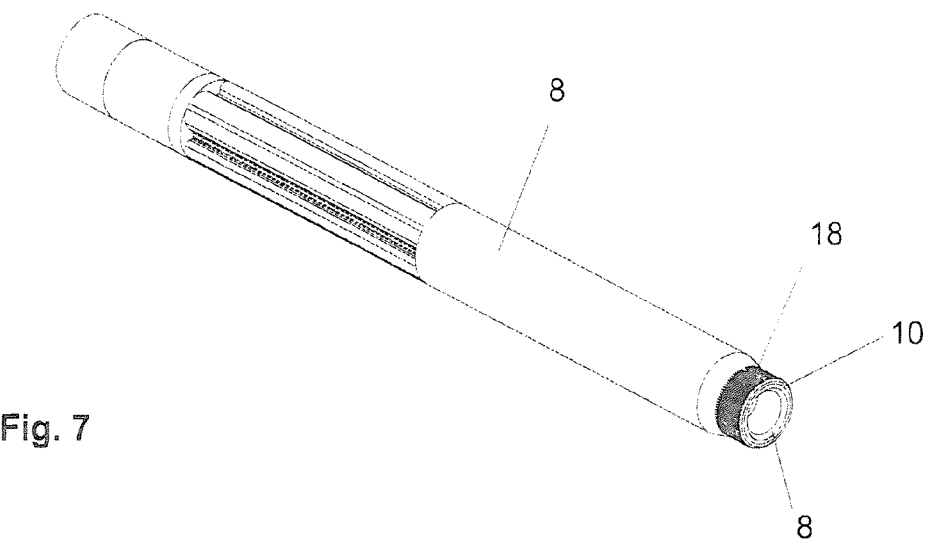
FIG. 7 is an oblique view of the finished steering spindle portion.
Figure 8:
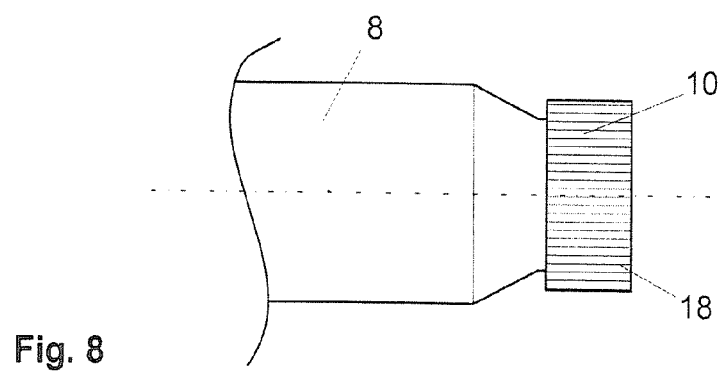
FIG. 8 is another view of the reinforcement section.
Figure 9:
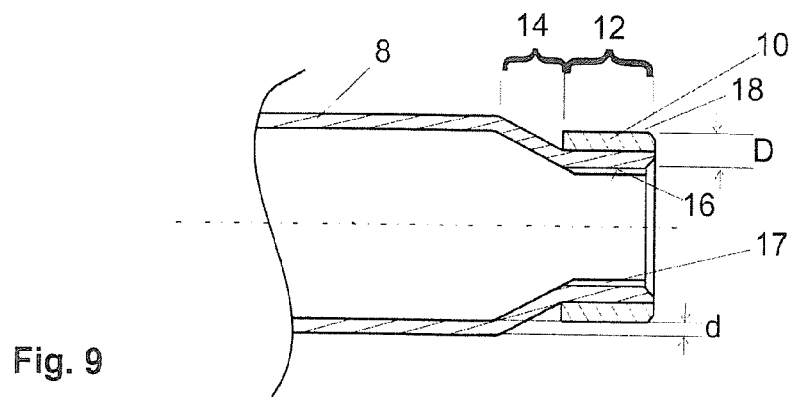
FIG. 9 a longitudinal cross-section of the reinforcement section and a portion adjoining thereon of the finished steering spindle portion.

The state in which the sleeve 10 is slid onto the tube 8 is depicted in FIG. 5.

The tube 8 is subsequently widened over the end section 9 encompassed by sleeve 10, whereby it is plastically deformed. By now at the latest the teeth of a toothing 22 applied in the end section 9 of the tube onto the outer surface of tube 8 extending in the axial direction of tube 8 cut into the inner surface 11 of sleeve 10. Hereby the connection between tube 8 and sleeve 10 is reinforced. During the widening of the end section 9 of tube 8 the sleeve 10 is elastically as well as also plastically deformed (in terms of a widening).

Through the cutting of the teeth of toothing 22 of tube 8 into the inner surface 11 of sleeve 10 a form closure against a mutual turning of these two parts 8, 10 is also realized.

The toothing 22 is advisably realized during the reduction of tube 8 over the section 13, for example using a suitable pressing tool. Implementation after the reducing step is also feasible.

During the widening of tube 8 in the end section 9 an inner threading 17 can simultaneously be worked into the inner surface 16 of tube 8 in the region of its end section 9. For this purpose, an expanding mandrel 23 can be utilized, which simultaneously is implemented as a mandrel for thread rolling, cf. FIG. 6.

An inner threading 17 could also be worked into the end section 9 of tube 8 after the step of widening the end section 9 of tube 8. The widening of end section 9 of tube 8 could also be carried out in a manner different from widening by a mandrel, for example also by a fluid under pressure.

The outer surface 24 of sleeve 10 is subsequently provided with a function contour 18. This serves for the implementation of a form closure acting in the rotational direction with a part, for example a steering wheel, to be connected to the steering spindle portion. This function contour 18 can be realized, for example, in the form of a toothing extending in the axial direction, as is evident in FIGS. 7 and 8. In working in the function contour 18 advantageously a radially inwardly acting force is applied, whereby a reduction of the outer diameter of the sleeve 10 takes place and in this manner the connection between the sleeve 10 and tube 8 in the end section 9 is further strengthened, for example thereby that the teeth of toothing 22 carve further into the inner surface 11 of sleeve 10. The decrease of the diameter of sleeve 10 occurs under the action of the inwardly directed force with the plastic deformation of sleeve 10. In the simplest case the inwardly directed force can be applied through a tool-specific pressing or also a rolling operation with or without simultaneous knurl.

Instead of applying a radially inwardly directed force onto the sleeve 10 simultaneously with working in a function contour 18, a radially inwardly directed force can be applied in a separate operation step (preferably before working in the function contour 18). It is also conceivable and feasible to reduce the sleeve additionally through an inwardly directed force after the function contour 18 has been worked in by the application of an inwardly directed force.

The finished steering spindle portion is depicted in FIGS. 7 to 10. Over an end region of the steering spindle portion, which in the depicted embodiment directly adjoins the end of the steering spindle portion (a minimal distance from the end of the steering spindle portion could also be provided) and over which the sleeve 10 encompasses the tube 8, the overall wall thickness D of the steering spindle portion is increased and this portion of the length of the steering spindle portion forms a reinforcement section 12 implemented in the form of a hollow shaft, which includes connection elements 17, 18 for the connection with another part of the steering column, in particular the steering wheel. In a section adjoining the reinforcement section 12 toward the longitudinal center of the steering spindle portion in the form of a hollow cylinder, here the expanding section 14 (and also in the sections 21, 19, 20 adjoining thereon) the wall thickness of the steering spindle portion is comparatively less. In the section 21 adjoining the expanding section 14, the wall thickness of the steering spindle portion corresponds to the original wall thickness d of tube 8. In the expanding section 14, it is comparatively minimally greater. The wall thickness D in the reinforcement section 12 corresponds approximately to the original wall thickness d of tube 8 plus the original wall thickness of sleeve 10.

The length of the reinforcement section 12 is preferably less than one tenth of the entire length of the steering spindle portion.

In the depicted embodiment, the steering spindle portion 1 is further provided over a section 19 of its longitudinal extent with a profile deviating from a circular form, which here is implemented in the form of a circumferential spiral toothing or a cloverleaf profile. This profiling serves for a connection, displaceable in the longitudinal direction, however secured under form closure against turning (telescope connection), with a further, not shown steering spindle part.

In sections 20, 21 of its longitudinal extent, the steering spindle portion is formed by the tube 8 in its original form. Consequently the tube 8 must only be worked by reforming over portions of its longitudinal extent.

According to a variant of this embodiment of the invention, during the axial sliding of sleeve 10 onto tube 8, the sleeve 10, in a section adjoining its end 25 facing away from the adjacent end of the steering spindle portion, is pressed onto the tube diameter expanding toward the center and herein is widened, as is depicted in FIG. 11.

In FIG. 11 is further schematically depicted a portion of a steering wheel 27 which is connected to the steering spindle portion. Herein the hub of the steering wheel is slid with an inner toothing onto the outer toothing formed by the function contour 18 and secured by a securement bolt 28 screwed into the inner threading 17.

A further embodiment variant of the invention will be explained in conjunction with FIG. 12. Here, a function contour is worked into the tube 8 for the implementation of a form closure acting in the rotational direction with the part to be connected to the steering spindle portion, and especially in an expanding section 14 adjoining the end section 12 encompassed by the sleeve toward the center of the tube 8. The function contour is here realized by a polygonal outer cross sectional form of this section 14. In this embodiment, the outer surface 24 of sleeve 10 can act as a centering face. In a working step of this centering face or in a separate working step (analogously to that described in connection with the first embodiment of the invention) a radially inwardly directed force can be applied onto sleeve 10 after the widening of the tube 8 in the region encompassed by the sleeve 10.

FIG. 13 shows further an embodiment in which the inner surface 11 of sleeve 10 is provided with a toothing 26 oriented in the axial direction.

Several further modifications of the described embodiments of the invention are conceivable and feasible without leaving the scope of the invention. Thus into reinforcement section 12 connection elements other than the inner threading 17 of tube 8 and the function contour 18 of sleeve 10 can be worked. For example, the function contour 18 could also be applied on the inner surface of tube 8 and the threading on the outer surface of sleeve 10. Implementations without threading, neither inner nor outer, are also conceivable and feasible.

FIG. 14 depicts an alternative embodiment of a sleeve 10 according to the invention. In the upper portion the sleeve 10 is shown in side view and in the lower portion as a cross-sectional longitudinal section. The sleeve 10 is divided into three sleeve sections, wherein the sleeve 10 is so slid onto the tube 8 that a first sleeve section 29 is directed in the direction toward the end 15 of the tube and has substantially a cylindrical form. Into a second sleeve section 30, which adjoins directly the first sleeve section, a function contour for torque transmission is worked, for example using cutting by material removal and/or reforming. Onto the second sleeve section 30 adjoins a third sleeve section 31 which also has a substantially cylindrical form. After the sleeve 10 has been slid onto the tube 14, in this embodiment preferably only the first sleeve section 29 is reformed or reduced through externally acting forces, wherein, analogous to the further embodiments, a further function contour or also only a centering seat can be worked in.

In the case of the several reforming operations or other fabrication steps, such as are provided in the embodiments of the invention, it is conceivable and feasible that the end 15 of tube 8 and the end of sleeve 10 oriented in the same direction assume a different position with respect to the longitudinal axis of sleeve 8. It is conceivable and feasible in a subsequent fabrication operation to work the end 15 of sleeve 8 in order to implement a planar front face or another desired geometry of the front face for the securement of the structural part, which is to be attached on this end of the steering spindle, for example on the steering wheel 27. The working preferably takes place through cutting by material removal, in particular to be able to avoid or reduce introducing stresses which could lower the strength of the connection between sleeve 10 and tube 8.

Figure 15:
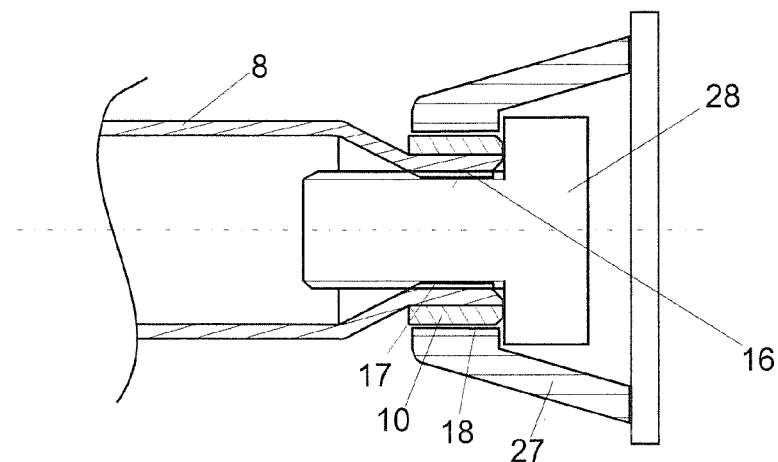
FIGS. 15, 16 and 17 show the securement of a steering wheel, a yoke for a universal joint and a steering pinion by means of a securement bolt on the steering spindle portion.
Figure 16:
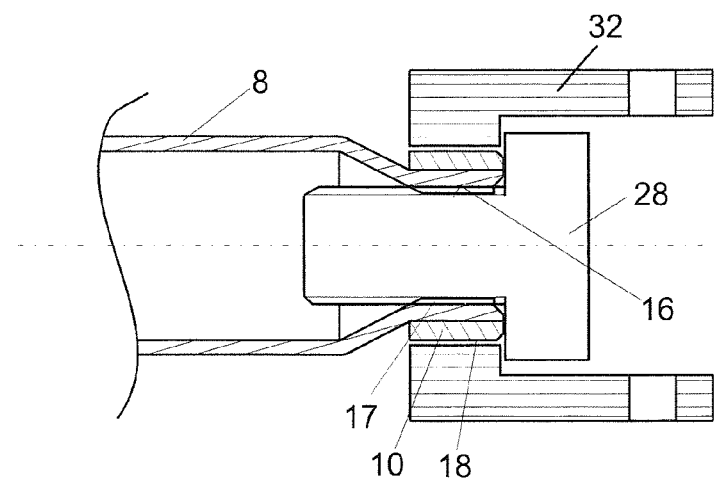
Figure 17:
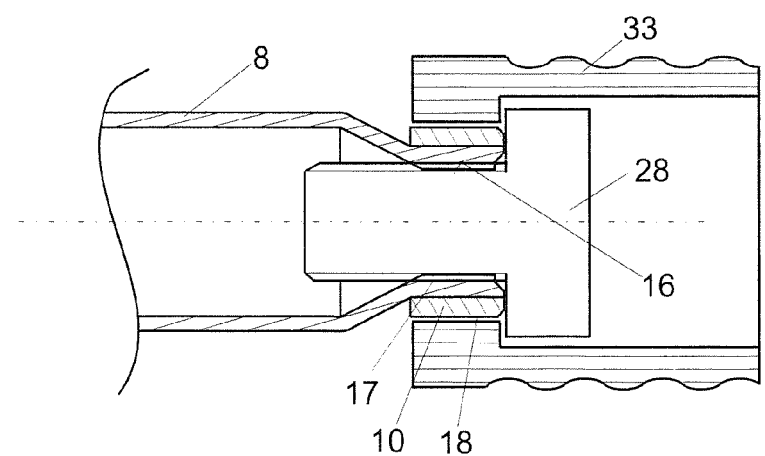

FIGS. 15, 16 and 17 depict a variant of the embodiment of the steering spindle portion described in conjunction with FIGS. 2 to 10, including the securement of a steering wheel 27 (FIG. 15) or a yoke 32 for a universal joint (FIG. 16) or a steering pinion 33 (FIG. 17). An inner toothing of the steering wheel 27, the yoke 32 or of the steering pinion 33 is slid onto the function contour 18 in the form of the outer toothing of sleeve 10. Subsequently the securement bolt 28 is screwed into the inner threading 17. Therewith, the steering wheel 27 or the yoke 32 or the steering pinion 33 is secured on the steering spindle portion.

Figure 18:
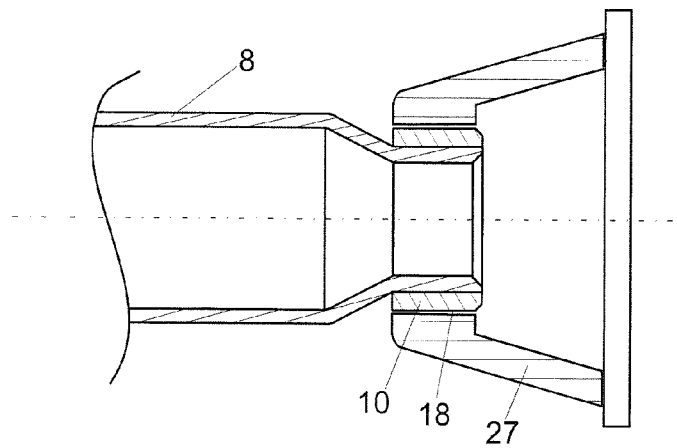
FIGS. 18, 19 and 20 show a further feasibility of securing a steering wheel, a yoke for a universal joint and a steering pinion on the steering spindle portion.
Figure 19:
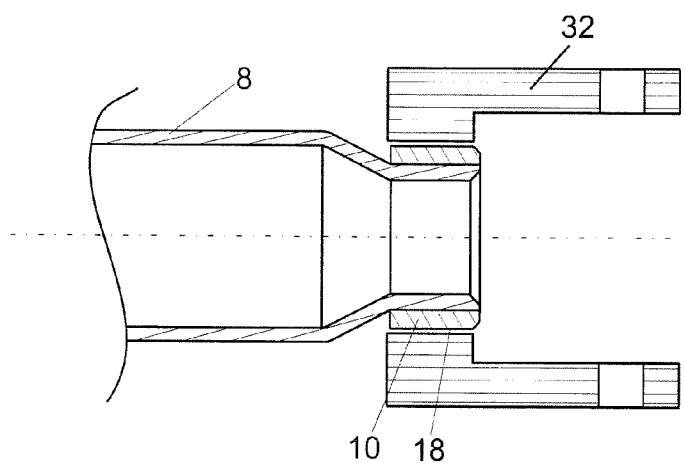
Figure 20:
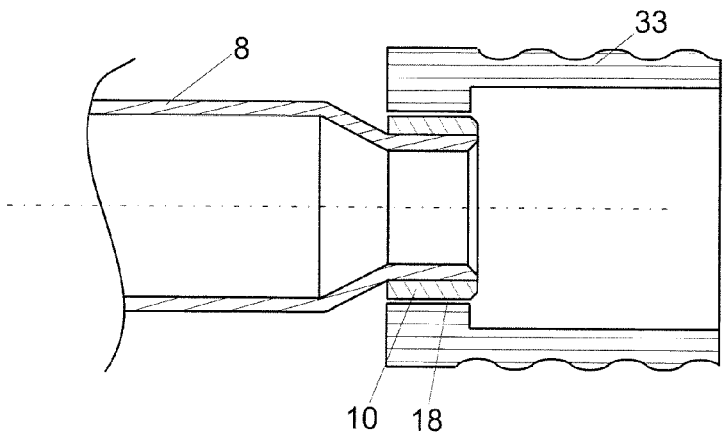

In a modified connection of a steering wheel 27 (FIG. 18) or of a yoke 32 for a universal joint (FIG. 19) or of a steering pinion 33 (FIG. 20) with the steering spindle portion, the steering wheel 27 or the yoke 32 or the steering pinion 33 is pressed axially onto the outer toothing forming the function contour 18, wherein a press fit is implemented. The securement bolt 28 and the inner threading 17 can in this case be omitted if desired.

LEGEND TO THE REFERENCE NUMBERS

1 Connection section
2 Hollow cylindrical section
3 Inner threading
4 Conical section
5 Section
6 Outer toothing
7 Section
8 Tube
9 End section
10 Sleeve
11 Inner surface
12 Reinforcement section
13 Section
14 Section
15 End
16 Inner surface
17 Inner threading
18 Function contour
19 Section
20 Section
21 Section
22 Toothing
23 Expanding mandrel
24 Outer surface
25 End
26 Toothing
27 Steering wheel
28 Securement bolt
29 First sleeve section
30 Second sleeve section
31 Third sleeve section
32 Yoke
33 Steering pinion

What is claimed is:

1. A method of producing a steering spindle portion forming a section of a steering spindle, which steering spindle portion, at least in an end region, includes a reinforcement section over which the steering spindle portion has a wall thickness (D) greater than a wall thickness of another section of the steering spindle portion, the another section of the steering spindle portion adjoining the reinforcement section in a direction toward a longitudinal center of the steering spindle portion, the steering spindle portion comprises a tube and a sleeve disposed in the reinforcement section of the steering spindle portion and forming the enlarged wall thickness (D), said method comprising:

forming the reinforcement section of the steering spindle portion by axially sliding the sleeve over an end section of the tube, and subsequently widening the tube at least over a portion of the length of the end section of the tube encompassed by the sleeve and to thereby plastically deform the tube and thereby elastically and plastically deform the sleeve; and providing connection elements which serve for the connection of the steering spindle portion with a steering wheel or a yoke forming a universal joint or a steering pinion, at least a portion of the connection elements being located in the reinforcement section reinforced by the sleeve.

2. The method of claim 1, wherein when the sleeve is axially slid onto the end section of the tube, a press fit is realized between the sleeve and the tube.

3. The method of claim 1, wherein before the sleeve is slid axially onto the end section of the tube, a diameter of the tube is decreased over the end section or a section encompassing the end section.

4. The method of claim 3, wherein during and/or after said decreasing of the diameter of the tube in the end section of the tube, a knurling is worked into the outer surface of the tube.

5. The method of claim 4, wherein the knurling is applied in the form of a toothing extending in the axial direction.

6. The method of claim 1, wherein before the sleeve is axially slid onto the end section of the tube, the inner surface of the sleeve is provided with a knurling.

7. The method of claim 6, wherein the knurling is applied in the form of a toothing extending in the axial direction.

8. The method of claim 1, wherein for the implementation of a form closure acting in the rotational direction with the part to be connected to the steering spindle portion, an outer surface of the sleeve is provided with a function contour.

9. The method of claim 1, wherein for the implementation of a form closure acting in the rotational direction with the part to be connected to the steering spindle portion, the outer surface of the tube is provided with a function contour in a section adjacent to the reinforcement section.

10. The method of claim 1, wherein after the tube has been widened over at least a portion of the length of its end section encompassed by the sleeve, a radially inwardly directed force or force component is applied onto the sleeve.

11. The method of claim 10 wherein an outer surface of the sleeve has a function contour, and when applying the radially inwardly directed force or force component onto the sleeve, the function contour is worked into the outer surface of the sleeve.

12. The method of claim 1, wherein the inner surface of the tube is provided with an inner threading at least over a portion of the length of the reinforcement section.

13. The method of claim 12, wherein, during the working of the inner threading into the inner surface of the tube, the widening of the tube takes place at least over a portion of the length of its end section encompassed by the sleeve.

14. The method of claim 1, wherein the tube has a section expanding toward the longitudinal center of the tube, the section adjoining the end section of the tube encompassed by the sleeve toward the longitudinal center of the tube.

15. The method of claim 14, wherein when the sleeve is axially slid onto the tube, the sleeve, over a section adjoining the end facing away from the adjacent end of the steering spindle portion, is pressed onto the expanding section of the tube and herein is widened.

\* \* \* \* \*